Jan. 24, 1967    W. F. GORHAM ET AL    3,300,332
COATED PARTICULATE MATERIAL AND METHOD FOR PRODUCING SAME
Filed Feb. 7, 1966

INVENTORS
WILLIAM F. GORHAM
BY HARRY L. WILLARD
ATTORNEY

United States Patent Office 3,300,332
Patented Jan. 24, 1967

3,300,332
COATED PARTICULATE MATERIAL AND
METHOD FOR PRODUCING SAME
William F. Gorham, Berkeley Heights, N.J., and Harry L.
Willard, Chappaqua, N.Y., assignors to Union Carbide
Corporation, a corporation of New York
Filed Feb. 7, 1966, Ser. No. 525,550
22 Claims. (Cl. 117—100)

This application is a continuation-in-part of copending application Serial No. 176,625, filed March 1, 1962.

This invention relates to a method for coating particulate material with a synthetic, organic, polymeric film. More specifically, the present invention relates to the encapsulation of particulate materials with polymeric films of p-xylylene polymers.

It has heretofore been proposed to provide such relatively inert materials as metallic gauze, copper wire, talc, and particulate titanium dioxide with coatings of poly(p-xylylene) by contacting the surface of these materials with the partial pyrolysis product of p-xylene. In general, p-xylene heated to about 900° C. undergoes molecular breakdown to form p-xylylene diradicals and a mixture of numerous other molecular fragments which upon cooling, condense to form a mass comprising polymer chains having a wide range of molecular weights and a mixture of other materials including some p-xylene, 1,2-di-p-tolyl-ethane and high molecular weight by-products. A considerable portion of the polymeric mass consists of substantially insoluble cross-linked poly(p-xylylene) but almost 10 to 20 weight percent of the polymeric mass comprises relatively low molecular weight material which is soluble in such common solvents as benzene, acetone, carbon tetrachloride, and chloroform.

In many applications the extractable content of the protective coating could prove to be a highly deleterious contaminant. Also, such extraction frequently destroys the continuity of the coating and renders it permeable to substrate attacking fluids, and vaporous materials.

This process also suffers with the disadvantage that only about 10–15% of the p-xylene is pyrolyzed, with the remaining 85–90% of the p-xylene passing through the system unchanged. Attempts to coat xylene-sensitive materials or other highly reactive chemicals thus cannot be successfully accomplished.

In contrast to the relatively inert materials which were coated by prior processes, it is an object of the present invention to provide means for coating surfaces which are potentially reactive or subject to chemical attack, particularly to attack by p-xylene, toluene and other materials in the by-products heretofore encountered in the pyrolysis of p-xylene.

It is a further object of the present invention to provide a method for coating materials with a polymer that is uniformly insoluble.

It is another object of the present invention to provide a method for coating materials with a linear polymer of p-xylylene substantially free of other potentially active materials and by-products of p-xylene pyrolysis.

It is yet another object to provide for the coating of large quantities of particulate material in a more convenient and uniform manner than was previously possible.

Still other objects will become apparent to one skilled in the art upon examination of the disclosure appearing hereinafter.

According to the present invention the coating of particle surfaces with a tough, solvent-resistant p-xylylene polymer film of substantially uniform composition is accomplished by the process which comprises vaporizing and pyrolyzing a cyclic di-p-xylylene to form the corresponding reactive p-xylylene diradicals thereof as essentially the sole organic component in the vapor, and thereafter contacting the outer surface of the particle to be coated with the vaporous p-xylylene diradicals thus produced while maintaining the particles in constant and continuous motion whereby fresh surfaces of the particles are being exposed to the vaporous diradicals and which particles are being maintained at a temperature of not greater than 200° C. whereby the p-xylylene diradicals condense and polymerize in situ on said particle surface to form a continuous p-xylylene polymeric coating around the said particles.

The above described process can be conducted in any suitable apparatus capable of maintaining the particles in continuous motion thereby exposing fresh surfaces of the particles to be coated, a specific embodiment of which is shown in the drawings in which.

Figure 1:
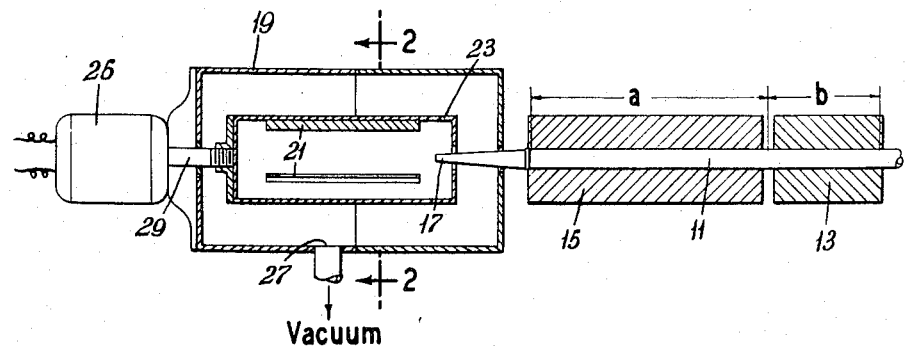
FIG. 1 is a diagrammatic representation of the general organization of the apparatus in cross section.

In the process aspect of the present invention the di-p-xylylenes which can suitably be employed are in general those represented by the formula:

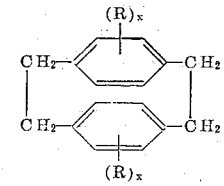

wherein each R is an aromatic nuclear substitutent group and $x$ is an integer from 0 to 3.

Each substituent group R can be the same or different and can be any inert organic or inorganic group which can normally be substituted on aromatic nuclei. Illustrations of such substituent groups are alkyl, aryl, alkenyl, amino, cyano, carboxyl, alkoxy, hydroxyl alkyl, carbalkoxy, and like radicals as well as inorganic radicals such as hydroxyl, nitro, halogen, and other similar groups which are normally substitutable on aromatic nuclei.

Particularly preferred of the substituted groups are those simple hydrocarbon groups such as the lower alkyls as methyl, ethyl, propyl, butyl, hexyl, the halogen groups, particularly chlorine, bromine, iodine and fluorine and also, the cyano group, and hydrogen, i.e., where $x$ is 0.

The cyclic dimer, di-p-xylylene, and the substituted dimers used in this process are known in the art. The substituted dimers can be prepared from di-p-xylylene by appropriate treatment for the introduction of substituent groups. The substitution reactions are preferably conducted at low temperatures due to the possibility of cleavage or rearrangement of the di-p-xylylene by strong acids at elevated temperatures. Di-p-xylylene readily enters into free radical, base catalyzed, or acid catalyzed slightly elevated temperature reactions thus halogenation, alkylation, acetylation, nitration, amination, cyanation, and like methods for the introduction of such substituent groups as can normally be substituted on aromatic nuclei are applicable.

Such workers as D. J. Cram et al., J. Am. Chem. Soc., 81, page 5977 (1959), 80, pages 3094 and 3126 (1958), 77, pages 1179, 1186 and 6289 (1955), have prepared a substantial number of such materials. Other such materials are the subject of several United States Patents such as U.S. 3,117,168 entitled "Alkylated Di-p-Xylylenes"; and U.S. 3,155,712 entitled, "Cyanated Di-p-Xylylenes," all of which are herewith incorporated by reference.

It has been found that a truly linear polymeric film can be obtained by condensing the reactive diradicals obtained by pyrolyzing the cyclic dimer (I) to the reactive diradical (II). Preferably the cyclic dimer is first vaporized at low temperatures before pyrolysis. Vaporization of the di-p-xylylene commences at temperatures above at least about 150° C. The primary step of vaporization rather than direct pyrolysis is used to prevent local overheating and degradation of the dimer and also to insure a more efficient pyrolysis. However, the vaporization is not critically necessary for operation of this process.

The pyrolysis of the vaporous di-p-xylylene occurs at temperatures exceeding about 450° C., and most advantageously, at temperatures between about 550° C. and 700° C. Said pyrolysis results in the quantitative cleavage of the di-p-xylylene (I) and the formation of the reactive diradicals of the structure

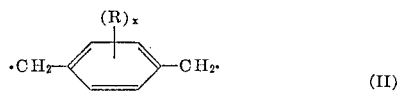
(II)

wherein R and $x$ are as defined in structure (I). In other words, the pyrolytic cleavage does not result in any change in the aromatic portions of the di-p-xylylene precursor (I), and no other organic moieties or entities are present in the pyrolysis vapors.

Regardless of the pressure employed, pyrolysis of the starting di-p-xylylenes begins at about 450° C. as pyrolysis does not appear to be a function of the operation pressure. At temperatures above about 700° C., cleavage of the substituent groups can occur, resulting in a tri- or poly-functional species causing cross-linking or highly branched polymers.

Pyrolysis temperature is essentially independent of the operating pressure. It is however preferred that reduced or subatmospheric pressures be employed. For most operations, pressures within the range of 0.0001 to 10 mm. Hg are most practical. However if desired, greater pressures can be employed. Likewise if desirable, inert non-organic vaporous diluents such as nitrogen, argon, carbon dioxide, steam and the like can be employed to vary the optimum temperature of operation or to change the total effective pressure in the system.

The diradicals formed in the manner described above are made to impinge upon the surface of the particulate material, said surfaces being maintained at temperatures below 200° C. and below the ceiling condensation temperature of the diradicals present thereby condensing threon and thus spontaneously polymerizing the diradicals to form a uniform coating of a linear polymer having the general structure

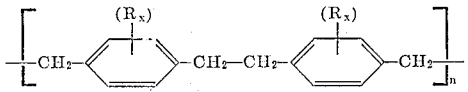

wherein R and $x$ are as defined in structure (I) and $n$ is a number from 10 to 10,000 or higher. Thus, it is seen that the condensation-polymerization operation does not affect the aromatic portion of the diradical (II), nor does it affect the substituent groups. It is readily observed that the R group is not critical and therefore can be any group normally substitutable on an aromatic nuclei, or hydrogen. When each R is the same, homopolymers are formed; however, when each R is different or $x$ is different, copolymers are formed.

These polymers have unusually good resistance to practically all solvents. They are completely unaffected by such solvents as alcohols, ethers, simple aromatic liquids, ketones, epoxides and amines. They are soluble at temperatures above 200° C. in such materials as benzylbenzoate, chloro- and bromo-naphthalene and chlorinated biphenyls. Thus particulate materials coated with such polymers can safely be exposed to solvents at normal temperatures even up to 200° C. without deleterious effect on the coating.

In this process, it has also been found possible to control the molecular weight of the polymers by control over the particular condensation conditions. It has been discovered for instance that within relatively narrow ranges of temperature changes in the condensation temperature (i.e. 10–20° C.) some distinct control over the molecular weight of the polymers can be secured, provided that all such temperatures are below the condensation temperature of the p-xylylene species.

In order to insure uniformity of coating of particulate material, the material must be maintained in such a random or continuous motion as to continually expose fresh surfaces to the condensing diradicals such as by tumbling, fluidized coating or suspension techniques, vibrational movement, or any other similar means to expose fresh surfaces of the particles.

The particular material that can be coated by the present invention can be in the form of pellets, small objects, granular particles and other preformed shapes and the like. The only restriction is that the material be able to be maintained in constant motion without losing its particulate nature, such as by crumbling or breaking. The grain strength and density of the particles should be as high as possible so as to prevent fracture of the particles on coating and in subsequent handling.

The apparatus adapted for the performance of the above-mentioned process is shown in the drawings.

Referring now to FIG. 1, said apparatus comprises a pyrolysis chamber 11 having two temperature zones $a$ and $b$. The zone $b$ is provided with heating means 13 sufficient to sublime or vaporize the di-p-xylylene disposed within that end of the pyrolysis chamber 11 and capable of maintaining a temperature of 150–200° C. The second zone $a$ communicating with the first zone $b$ is provided with heating means 15 sufficient to pyrolyze the vapors produced in said first zone $b$.

In a preferred embodiment, the pyrolysis tube 11 is composed of Vycor or quartz tubing. The heating means 15 is a combustion furnace capable of maintaining temperature of at least 450° C. to about 700° C. A coating chamber 23 is equipped with baffles 21 and which is adapted to have particulate material disposed therein is penetrated by the nozzled posterior portion 17, of the aforementioned pyrolysis chamber 11. Rotatable means such as motor 25 and connecting shaft 29 impart a rotary motion to the coating chamber 23. Said motor and shaft being adapted to support and also impart to said coating chamber 23 a movement whereby the said particulate material in said coating chamber 23 undergoes a tumbling motion. Other types of tumbling means could also be used to impart motion to the coating chamber 23. It is important, however, to keep the particles in random motion so as to continually expose fresh surfaces for coating.

The agitating means is not restricted to a motor and connecting shaft; any electro-mechanical device capable of imparting vibrational, rotational, translational motion or a combination thereof can be incorporated into said agitating means with the provision that a continuous random motion as hereinbefore mentioned be imparted to the particulate material disposed within the said coating chamber 23. For instance, a magnetic coupling device can be used whereby a rotating magnetic field set up by the agitating means is transferred to the coating chamber thus imparting a rotary motion to said coating chamber 23. A vacuum-supporting wall 19 surrounds said coating chamber 23 and the nozzled posterior portion 17 of the pyrolysis chamber 11. Vacuum seals (not shown) are advantageously employed at the points of entry of the connecting shaft 29 and the nozzled posterior portion 17 of the pyrolysis chamber 11 into the wall 19. Said vacuum supporting wall 19 is preferably detachably connected to permit said wall 19 to be opened into two sections so as to permit entry and exit of coating chamber 23. An aperture 27 in said wall 19 leads to a vacuum pump (not shown) or suitable vacuum unit.

Figure 2:
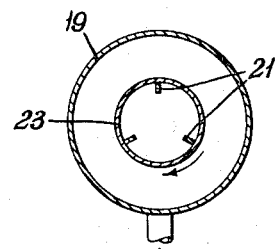
FIG. 2 is a cross section of the coating chamber 23 taken along line 2—2 in FIG. 1.

Referring now to FIG. 2, the cross sectional view 2—2 of the coating chamber 23 of FIGURE 1, shows in detail the baffles 21 provided within said coating chamber 23 whereby the tumbling motion of the particulate material disposed within said coating chamber 23 is enhanced.

The specific embodiment of the present invention represented in FIGURE 2 shows a plurality of baffles, however, a greater or lesser number of baffles can satisfactorily be employed provided that the particulate material disposed within the coating chamber 23 is continuously agitated and said agitation is augmented by the said baffles 21.

The quantity of material handled by the present apparatus is limited only by the size of the coating chamber 23.

In order to insure uniformity of coating, the coating chamber 23 is advantageously rotated at from about 10–500 r.p.m. thus continuously tumbling the particles and exposing fresh surfaces to the condensing diradicals.

Premature condensation and polymerization of the diradicals on surfaces other than those presented in the coating chamber is prevented by maintaining all surfaces in contact with the diradicals except those within the coating chamber at temperatures above about 150° C.

Other obvious modifications can be made to this apparatus as desired. For example, means for continuously or batch-wise feeding of the di-p-xylylene to the vaporization section of tube 11 can be employed using vacuum traps or positive displacement feed units sealed to vacuum. Likewise, continuous feed of particulate material to be coated in chamber 23 can be provided without departing from the scope and intent of the present invention.

In accordance with the preferred mode for carrying out the present invention, a measured quantity of the appropriate di-p-xylylene is placed within the vaporization zone of the pyrolysis chamber. The system is evacuated to the aforementioned pressure level and the di-p-xylylene is then passed through the pyrolysis zone. The pyrolysis zone should be long enough to provide for a residence time of .001 to 1 second, or at least sufficient time to pyrolyze all the di-p-xylylene to the reactive diradical. The diradicals formed in the pyrolysis zone are passed through the nozzled portion of the pyrolysis chamber into the coating chamber which is under vacuum and maintained in a rotary motion. The diradicals contact the particulate material while said material is being continuously tumbled within the coating chamber and condense on the surfaces of said material thus forming a polymeric film of the p-xylylene polymer. After the desired thickness of coating has been maintained, the unit can be turned off and the coated particle recovered from the coating chamber.

The thickness of the polymeric coating is not narrowly critical but is dictated by the intended end use of the product. Certain materials can be coated with only a very thin coating of 0.1 mil or less of a p-xylylene polymer where only resistance to solvent to reactive attack is desired. With other materials which may be subjected to mechanical abuse during subsequent handling and use, it may be desired to coat the particles quite heavily, with one mil or more of polymer coating on the surface. For highly reactive materials such as those that are very sensitive to the presence or absence of atmospheric moisture, we prefer to coat with amounts of 3–15 percent by weight of particles of the desired p-xylylene polymer, although where passivation of the surface only is desired, amounts of one percent or less can be used and where excellent mechanical strengths are desired, amounts of 50–100 percent by weight can be employed.

It is a very desirable embodiment of this invention to coat highly reactive or hygroscopic materials by this technique. Such materials as lithium aluminum hydride, lithium hydrides, boron hydrides, solvated aluminum hydride and like hydrides which are highly reactive at reducing agents can be encapsulated with the inert polymer without any effect on the poly-p-xylylene. Strong oxidizers such as ammonium perchlorate and lithium perchlorate have also been successfully encapsulated so that they can be completely immersed in water and conventional organic solvents without reaction. Free metals such as lithium, sodium, potassium, cesium, rubidium metals and other similar highly reactive materials are readily coated with these polymers by this technique, to make it possible to readily store and handle such materials. Solid pellets of sodium and potassium hydroxide have also been successfully encapsulated by this technique such that even immersion in water is completely safe.

Precoated liquid droplets have also been encapsulated by means of the present invention. For example, liquid droplets have been pre-coated by gelation coacervation techniques and thereafter top coated wtih a p-xylylene polymer to give improved storage stability. In a similar manner other organic liquids and aqueous solutions or mixtures have been pre-coated with gelatin, paraffin, polymeric materials, combinations thereof and the like and thereafter given a protective top coat by the process of the persent invention. Other techniques can be used to coat liquids directly. For example, coating is usually conducted at ambient conditions; however, the coating process of the present invention can be conveniently conducted at temperatures below the freezing point of various liquids thereby coating the liquid while in the solid state. Water, for instance, can be encapsulated with poly-p-xylylene by encapsulating ice particles at temperatures below about 0° C. Some solids such as phthalic anhydride, p-dichlorobenzene, and the like have too high a vapor pressure to be coated at ambient conditions; however, these materials can be readily coated by pre-cooling the material and conducting the coating operation at temperatures sufficiently low so that the vapor pressure of the material is below that of the system. Also, the present invention can be employed to encapsulated reactive additives such as catalysts, hardeners or cross-linking agents for use with thermoplastic or thermosetting resins to provide controlled release for optimizing dispersion and improving shelf life and also for eliminating handling and odor problems.

This coating of such reactive materials could not be successfully accomplished by the technique of direct pyrolysis of p-xylene. In that pyrolysis, any so coated material would be so permeable to liquids and gasses due to the 15–20% extractables in the film that encapsulation would not be satisfactory, for all intended uses of the material. In addition, the 85–90% of unconverted p-xylene in the system could create unwanted and possible dangerous conditions in coating of any xylene sensitive materials.

With this new technique, however, solid moisture-impermeable, solvent-insoluble coatings are possible which will completely protect the reactive material. However, since the substituent R groups, if any, on the aromatic ring can be reactive groups such as cyano, carboxyl, hydroxy, etc. groups, it is quite obvious that the polymer selected for coating of reactive surfaces be free of those known to react with the compound to be coated, and thus the polymer remains inert to the reactive compounds. However with an inert surface, it is not necessary to so carefully observe this precaution.

The examples shown below are illustrative of the various applications of the present invention. Said examples exhibit the protection afforded by coating various particulate materials with polymeric films of p-xylylene polymers.

A comparison is made between the samples coated in the manner prescribed by the present invention and equivalent samples without said protective coatings. All of the samples offer potentially reactive surfaces towards chemical attack. Coating with a p-xylylene polymeric film renders the samples inert, for all practical purposes, to further chemical attack.

These examples are included for illustrative purposes and are in no way intended to limit the scope of the present invention. Unless otherwise stated all parts and percentages are by weight.

*Example I.—Encapsulation of lithium aluminum hydride with poly(chloro-p-xylylene)*

Dichloro-di-p-xylylene was prepared by mixing 10.4 grams of di-p-xylylene with 500 ml. of carbon tetrachloride, and 0.1 gram of iron powder in a one liter, three necked flask equipped with stirrer, drying tube and gas inlet tube. The flask was cooled in a water bath. A total of 7.1 grams of chlorine was bubbled into the stirred suspension through the gas-inlet tube over a 30 minute period. The reaction was completed at the end of one hour, as evidenced by the disappearance of the characteristic chlorine color in the solution. The product was purified by vacuum distillation, and amounted to 14 grams, or 99% yield. The product melted at 160°–170° C. and gave a chlorine analysis of exactly 25.0%, matching the theoretical value of 25.0%. It had the structure

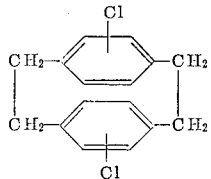

The coating chamber consisted of a two-piece glass chamber, overall dimensions of 3 inches in diameter and 12 inches long having ground-glass joint at about the middle to allow the chamber to be opened. Through one end of the chamber is connected a glass inlet tube for feeding in the pyrolysis vapors of the substituted di-p-xylylene. The substituted di-p-xylylenes are vaporized in a glass chamber immediately preceding the pyrolysis zone. The vaporization chamber is maintained at a temperature of about 150–200° C. and connected to a quartz pyrolysis zone heating with an electric heating furnace to temperatures of 500°–700° C. for pyrolysis of the vapors.

Two outlets are provided in the coating chamber, one for attachment to the vacuum system, the other through a vacuum seal providing a stirrer bearing. A metal stirring shaft, ground to fit the stirrer bearing is inserted through the bearing and connected to motor means outside the coating chamber for rotating the stirrer at about 50–100 r.p.m. A bottle clamp or holder is attached to the end of the shaft inside the coating chamber for holding the bottle containing the particulate material but providing for free tumbling of the pellets inside the bottle on the rotation of the shaft. The bottle clamp holds the bottle on its side during the coating and the inlet tube for feeding in the pyrolysis vapors enters into the mouth of the bottle holding the pellets to be coated when the unit is assembled.

Five grams of the monomeric dichloro-di-p-xylylene were placed in the distillation zone of apparatus substantially the same as that described above. Ten grams (400 pellets) of lithium aluminum hydride in the form of one eighth inch diameter pellets were placed in a four-ounce polyethylene container. The container was clamped in position within the coating chamber and the system was then evacuated to 0.01 mm. Hg. The coating operation was continued for thirty minutes during which time the bottle was continuously rotated at 75 r.p.m. At the end of the run the bottle was removed and the pellets were found to weigh 11.27 grams.

As a test of the degree of encapsulation, the pellets were placed in pure methanol. An uncoated pellet reacts completely with methanol within fifteen seconds to liberate 85 mls. of hydrogen. With the pellets encapsulated as described above, no reaction occurred in the coatings of 393 pellets whereas only a minute pinhole was observed in the coatings of seven of the pellets as evidenced by evolution of a small continuous stream of hydrogen.

*Example II.—Encapsulation of lithium aluminum hydride with poly(chloro-p-xylylene)*

Two grams of lithium aluminum hydride pellets were coated with polymerizing chloro-p-xylylene diradicals produced by the pyrolysis of 6.0 grams of dichloro-di-p-xylylene over a thirty minute period in apparatus as in FIG. 1. After the coating operation, the pellets were found to weigh 2.37 grams and had a smooth even coating of poly(chloro-p-xylylene) of high molecular weight. Twenty of the encapsulated pellets, randomly chosen, were found to be unaffected after immersion in methanol for twenty-four hours, with no pinhole leaks observed.

*Example III.—Encapsulation of ammonium perchlorate granules with poly(chloro-p-xylylene)*

In the same equipment and employing the same technique as described in Example I, irregularly-shaped granules of ammonium perchlorate were coated with the poly(chloro-p-xylylene). One gram of dichloro-di-p-xylylene was vaporized and pyrolyzed in the pyrolysis chamber to yield the chloro-p-xylylene diradicals which were condensed on the tumbling granules of ammonium perchlorate.

The granules were coated with 13.8 percent of their original weight with poly(chloro-p-xylylene) which coating was even, smooth and tough. They were unaffected by complete immersion in water for days whereas ammonium perchlorate itself is rapidly dissolved in water.

*Example IV.—Encapsulation of lithium perchlorate with poly(dichloro-p-xylylene)*

In the same manner as described in Example I, tetrachloro-di-p-xylylene having the formula

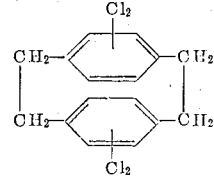

was prepared as follows.

In a 500 ml., three-nicked flask equipped with stirrer, addition funnel, and reflux condenser was placed 5.0 grams of di-p-xylylene, 150 ml. of carbon tetrachloride, and a pinch of iron powder. The flask was immersed in a water bath at 10° C. and a solution of 6.8 grams of chlorine in 150 ml. of carbon tetrachloride added to the stirred mixture over a period of one hour. The solution was stirred for an additional hour, heated to reflux to drive off the by-product hydrogen chloride, and filtered to remove the iron. The solvent was removed by atmospheric distillation and the product purified by vacuum distillation. A total of 7.1 grams of tetrachloro-di-p-xylylene (85% yield) B.P. 180–190° C. at 0.2 mm., M.P. 130–140° C. was obtained. The material contained 40.7% chlorine by elemental analysis compared with the theoretical value of 41% chlorine for tetrachloro-di-p-xylylene, and had the structure

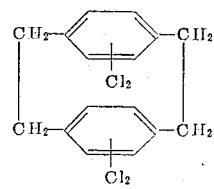

Pellets of lithium perchlorate about ⅛ inch in diameter were coated in the equipment following the technique as set forth in Example I so as to have an even coating about the entire pellet of poly(dichloro-p-xylylene), in amounts of about 15 percent by weight of the original pellet weight, are free of pinholes. Complete immersion of the so coated pellets in methanol or water does not affect the pellets.

*Example V.—Encapsulation of lithium aluminum hydride with poly(bromo-p-xylylene)*

A mixture consisting of 5 grams of di-p-xylylene, 0.1 gram of iron powder and 400 ml. of carbon tetrachloride was placed in a 500 ml. three necked flask, equipped with a reflux condenser, stirrer and addition funnel. A solution of 10 grams of bromine in 50 ml. of carbon tetrachloride was added dropwise from this addition funnel to the stirred suspension over a 30 minute period. The reaction mixture was stirred at 10° C. to 20° C. for twelve hours. The catalyst was filtered off and the solution concentrated to 30 ml. by distillation. Upon cooling, di-bromo-di-p-xylylene crystallized from solution. The material was separated by filtration, and purified by sublimation. A total of 3.3 grams equivalent to 37% yield was obtained. The material had a melting point of 240°–242° C. The material analyzed for 43.5% bromine, as compared with the theoretical value of 43.7% for di-bromo-di-p-xylylene, having the structure

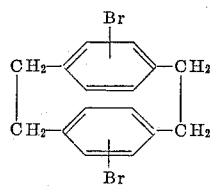

This dibromo-di-p-xylene, pyrolyzed, in the same manner as described in Example I, produces the bromo-p-xylylene diradicals which condense and polymerize on the surface of the lithium aluminum hydride pellets to provide a smooth, tough, moisture-impermeable coating on the surface rendering the lithium aluminum hydride free from attack by methanol, acetone, benzene, and methyl ethyl ketone.

*Example VI.—Encapsulation of lithium aluminum hydride with poly(cyano-p-xylylene)*

Employing the dibromo-di-p-xylylene prepared as described in Example III, the dicyano-di-p-xylylene was prepared as follows:

Into a dry 100 ml. three-necked flask fitted with a reflux condenser protected from moisture with a drying tube, a thermometer, and a dry nitrogen-gas inlet was placed 7.32 grams of dibromo-di-p-xylylene, 4.5 grams of dry cuprous cyanide and 20 ml. of dry quinoline. The mixture was heated at 210° C. to 230° C. for 20 hours with continuous stirring. After the reaction period, the mixture was cooled to about 100° C. and poured into a mixture of 100 ml. each of benzene and 29% aqueous solution of ammonium hydroxide. The concentration was half that of the commercially available aqueous ammonium hydroxide (58%). The mixture was shaken well until all the course particles disintegrated. The benzene layer was separated, washed with dilute aqueous ammonium hydroxide, water, and then filtered. After concentrating the benzene solution to dryness, the crude solid residue was distilled under vacuum to give a slightly colored crystalline product. The color is due to traces of quinoline.

The distilled product was recrystallized from 95% ethanol to give an analytically pure product having a melting point of 165° C. to 167° C. and in a yield of 81%. Elemental analysis confirmed the structure.

Calculated for $C_{18}H_{14}N_2$: C, 83.72; H, 5.43; N, 10.85. Found: C, 83.45; H, 5.70; N, 10.5.

No bromine was detected.

Two grams of lithium aluminum hydride pellets were encapsulated with polymerizing cyano-p-xylylene diradicals product by the pyrolysis of 3.0 g. of dicyano-di-p-xylylene over a ten minute period in apparatus substantially as in FIG. 1. The resulting weight of the coated pellets was 2.17 grams. Twenty of the pellets, chosen at random, were found to be completely unaffected after immersion in methanol for six hours.

*Example VII.—Coating of rubber stoppers with poly-(chloro-p-xylylene)*

Six rubber stoppers were coated with polymerizing chloro-p-xylylene diradicals produced by pyrolysis of 5.0 grams of dichloro-di-p-xylylene over a twenty minute period in apparatus substantially the same as FIG. 1. The stoppers were removed at the end of the run and were individually weighed. The weight increase ranged from 0.22 to 0.28 gram. Three of the coated stoppers were in heptane for one week without effect. A rubber stopper without a protective poly(chloro-p-xylylene) coating used as a control in the experiment was attacked and badly swollen when contacted with heptane for the same period of time.

*Example VIII.—Encapsulation of chemical-loaded molecular sieves with poly(chloro-p-xylylene)*

Eleven grams of a chemical-loaded molecular sieve consisting of ethylene adsorbed in a type 5A molecular sieve in the form of $\frac{1}{16}$ inch pellets were encapsulated with polymerizing chloro-p-xylylene diradicals produced by the pyrolysis of 5.0 grams of dichloro-di-p-xylylene over a twenty minute period in apparatus substantially as in FIG. 1. The weight of the encapsulated sieves was 11.15 grams. Encapsulated molecular sieves are useful in latent chemical acting systems which when subjected to temperatures which melt the coating, result in the coating becoming discontinuous and allow the chemical agent freedom of movement from the molecular sieve carrier.

*Example IX.—Encapsulation of packing material with poly(chloro-p-xylylene)*

One hundred grams of gravel used as packing material were encapsulated with polymerizing chloro-p-xylylene diradicals produced by the pyrolysis of 6.0 grams of dichloro-di-p-xylylene over a twenty-five minute period in apparatus substantially as in FIG. 1. The encapsulated gravel weighed 103.56 grams.

Under cryogenic conditions, gravel used as packing material was found to flake and crumble while being cooled or heated to and from the required cryogenic conditions. However, samples of the gravel coated with poly(chloro-p-xylylene) subjected to the same temperature conditions were found to remain intact.

*Example X.—Encapsulation of lithium fluoride pellets with poly(ethyl-p-xylylene)*

In a dry three-necked flask equipped with a drying tube, a thermometer and an efficient stirrer, there were placed 3.4 grams (0.025 mole) of anhydrous aluminum chloride, 50 ml. of dry sym. tetrachloroethane and 8.5 ml. (0.113 mole) of ethyl bromide (or equivalent ethyl chloride). The mixture was cooled to $-15°$ C. To the cooled mixture was added 2.6 grams (0.0125 mole) of di-p-xylylene the mixture was stirred at $-10°$ C. to $-15°$ C. for an hour. After the reaction period, the mixture was cooled to a temperature of $-30°$ C. and 15 ml. of 1 N aqueous hydrochloric acid added dropwise to the mixture with vigorous stirring. The mixture was slowly brought to room temperature and the aqueous layer removed. The organic layer was washed successively with aqueous sodium bicarbonate, water, and then was dried with sodium sulfate, and solvent removed by heating. Unreacted di-p-xylylene was removed by washing with n-heptane and the product recrystallized from ethanol to yield the ethyl-di-p-xylylene having a melting point of 110–115° C. in a yield of 85% of theoretical. The above procedure was repeated on the ethyl-di-p-xylylenes to the removal of the solvent.

Distillation of the product at 140°–180° C. at 0.5 mm. Hg gave 2.8 grams (85% yield) of solid product which was diethyl-di-p-xylylene of a purity over 70% having the structure

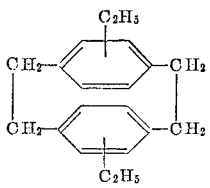

The diethyl-di-p-xylylene was in two isomeric forms in a ratio of about 6:1, and contained some ethyl-di-p-xylylene.

The diethyl-di-p-xylylene was vaporized and pyrolyzed essentially as described in Example I and the ethyl-p-xylylene diradicals were coated onto pellets of lithium fluoride to give a uniform coating of poly(ethyl-p-xylylene) in an amount of about 12 percent by weight of the pellets. This coating while somewhat softer and a little tackier than the poly(p-xylylene) or poly(chloro-p-xylylene) satisfactory coated the pellets to give a moisture and solvent resistant coating.

*Example XI.—Encapsulation of metallic lithium with poly(chloro-p-xylylene)*

In an argon atmosphere, pellets of lithium were prepared by cutting approximately ¼-inch lengths from ⅛-inch diameter lithium wire. Grease was washed from the surface by washing in heptane for five minutes, and drying the washed pellets. The pellets were placed in a four-ounce polyethylene bottle. The pellets weighed 0.42 gram.

In the same manner as described in Example I, the lithium pellets were coated with poly(chloro-p-xylylene) by pyrolysis of 1.5 grams of dichloro-di-p-xylylene over an eight minute period. The pressure in the system was kept at about 0.01 mm. during the encapsulation. The weight of the encapsulated particles was 0.465 gram and the coating on the pellets was smooth and uniform. Exposure of the pellets to air did not harm the pellets. Two of the coated pellets were tested for perfection of encapsulation by placing them in water and measuring for hydrogen evolution. There was no measurable evolution after a thirty-day test period.

Uncoated lithium readily reacts with moisture to form lithium hydroxide and with nitrogen to form the nitride, neither of which occurs with encapsulated material.

Repetition of this example with di-p-xylylene, diethyl-di-p-xylylene, gave a smooth, tough coating on the pellets of poly(p-xylylene) and of poly(ethyl-p-xylylene) in both instances which was completely moisture resistant.

*Example XII.—Encapsulation of lithium fluoride with poly(chloro-p-xylylene)*

A total of 4.85 grams of lithium fluoride granules having an average particle size of about 8 mesh were encapsulated with polymerizing chloro-p-xylylene diradicals produced by pyrolysis of 2.0 grams of dichloro-di-p-xylylene over a ten minute period in the same manner as set forth in Example I. The coated granules weighed 4.997 grams and the coating was smooth, uniform and continuous over the entire surface of the granules.

Repetition of this example with di-p-xylylene and diethyl-di-p-xylylene gave smooth, tough coatings and complete encapsulation with poly(p-xylylene) and with poly-(ethyl-p-xylylene).

*Example XIII.—Encapsulation of sodium hydroxide pellets with poly(chloro-p-xylylene)*

A total of 3.8 grams of sodium hydroxide pellets were encapsulated with polymerizing chloro-p-xylylene diradicals produced by pyrolysis of 1.5 grams of dichloro-di-p-xylylene in the same manner previously described over an eight-minute period. The weight of the encapsulated pellets was 4.02 grams. The perfection of the coating was tested by placing six of the thus coated pellets in distilled water. No pH change occurred in the water over a twenty-four hour test period. The coating was smooth and uniform about the entire pellet.

*Example XIV.—Encapsulation of gelatin coated dioctyl phthalate with poly(chloro-p-xylylene)*

A mixture containing 175.6 grams of a 10% aqueous solution of pigskin gelatin and 355 grams of di-octyl phthalate (DOP) was stirred as an emulsion at 52° C. by means of a magnetic stirrer-hotplate combination. To this mixture was added dropwise 83.2 ml. of a 20% aqueous solution of sodium sulfate. Temperature during this addition was 51°–53° C. The resulting gelled emulsion was quickly poured into 2080 ml. of a 7% aqueous solution of sodium sulfate which had been previously chilled to 17° C. The solid particles were removed by filtration, washed twice with water, treated with several 100 ml. volumes of 37% aqueous formaldehyde to harden the gel, and finally rewashed with a large volume of water. The filter cake was dried at 100° C. under reduced pressure, comminuted, and screened through a 10–20 mesh sieve combination.

The 10–20 mesh material was encapsulated with poly(chloro-p-xylylene) in the same manner as set forth in Example I to the extent of 6% by weight.

The loading of the encapsulated particles was determined by placing a 1.00 gram sample between two filter paper mats and crushing at 15,000 p.s.i.g. repeatedly, thus breaking the capsules and absorbing the DOP in the filter paper media. The crushed hulls were then extracted with acetone to remove last traces of DOP, dried under reduced pressure, and weighed, affording a final weight of 0.31 gram. This indicated that the hulls had consisted of 69% DOP, 25% gelatin, and 6% of poly(chloro-p-xylylene).

*Example XV.—Encapsulation of lithium tetraborate with poly(chloro-p-xylylene) and with poly(cyano-p-xylylene)*

Small samples of small particle size (6–8 mesh) lithium tetraborate granules were coated in two separate experiments, with poly(chloro-p-xylylene) in one experiment and with poly(cyano-p-xylylene) in another, in the same manner as the previous samples. In both cases, the polymer coating was smooth, uniform and continuous about the particle and formed a tough moisture and solvent resistant coating completely protecting the pellet from ambient atmospheric conditions and solvents.

*Example XVI.—Encapsulation of lithium aluminum hydride with other poly(p-xylylene)'s*

In the same equipment and employing the same techniques as set forth in the previous examples, lithium aluminum hydride was successfully encapsulated with poly(p-xylylene), poly(dichloro-p-xylylene) and poly(cyano-p-xylylene).

*Example XVII.—Encapsulation of lithium hydride with poly(chloro-p-xylylene)*

Employing the same technique and method described in Example I, 3.01 grams of lithium hydride, granules −6 to +10 mesh in size was coated with poly(chloro-p-xylylene) by vaporizing 3.0 grams of dichloro-di-p-xylylene and pyrolyzing at about 660° C. at 25 microns pressure. The coating operation was conducted twice and the thus coated pellets weighed 4.02 grams. Pellets placed in water showed no hydrogen evolution after two weeks.

*Example XVIII.—Encapsulation of an epoxy resin catalyst with a copolymer of mono-methyl-p-xylylene and p-xylylene*

The apparatus shown in FIGURE 1 was modified to impart vibrational movement to the coating chamber 23. This was accomplished by providing an air driven vibrator as the source of vibration. The vibrations were transmitted from a steel diaphragm into the coating chamber by means of a piston operating through a Teflon expansion bellows. The piston was directly coupled to the coating chamber containing the material to be coated.

An epoxy resin catalyst, boron trifluoride monoethyl amine complex, in particulate form, was encapsulated in the above apparatus in a manner similar to that described in Example I. The particulate catalyst was coated with 1% of an 80:20 copolymer of monomethyl-p-xylylene and p-xylene produced by the pyrolysis of monomethyl di-p-xylylene. This copolymer was chosen because of its dissolution at elevated temperatures. The coated catalyst was then blended with ERL-2774, the diglycidyl ether of Bisphenol A. The coated catalyst remained inactive in the epoxy system until the mixture was heated to 195° C. At this temperature, the catalyst had ruptured and gelation occurred quite rapidly. An unheated sample of the blend was retained and found to exhibit excellent storage stability. A control experiment in which the uncoated catalyst was employed exhibited gelation at 150° C. in two minutes and was unstable on storage.

The apparatus and method defined in the instant invention enable coatings of high molecular weight to be applied to any particulate material. The resultant coating is a linear polymer and this family of polymers is uniformly insoluble in ordinary solvents such as ketones, alcohols, ethers, aromatic liquids, amines, etc. This not only provides for superior solvent resistance but also makes it useful in application which cannot tolerate contamination by impurities. Distinct solvent solubility of these polymers is exhibited only in such exotic solvents as chlorinated biphenyls, α-chloronaphthalene, and benzyl benzoate at elevated temperatures, i.e., about 200° C. and above which are not normally encountered in organic reactions. However, where it is desired to remove the coating, such as to make the reactive materials available for reaction, such solvent materials can be employed. However, for such materials as the ammonium perchlorate and lithium aluminum hydride which can be used in rocket and missile fuel application, the heat of combustion of the fuel system readily melts and burns the poly-p-xylylene coating and makes these materials readily available to serve their intended purpose as oxidizer or reducing agent.

The present invention finds other utility in the protection of potentially reactive surfaces. Chemical attack, swelling, flaking, water absorption due to the hydroscopic nature of the material can be effectively eliminated by the application of a poly(p-xylylene) coating as disclosed in the present invention.

What is claimed is:

1. Method for the encapsulation of particulate materials which comprises pyrolyzing a cyclic di-p-xylylene having the general structure

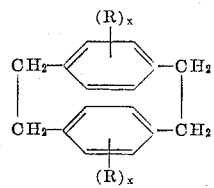

wherein R is an aromatic nuclear substituent group and x is a number from 0 to 3, at a temperature between about 450° to 700° C. thus forming reactive diradicals having the general structure

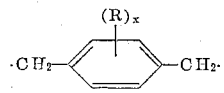

wherein R and x are as defined above, and thereafter contacting the outer surface of the particles with said diradicals while maintaining the particles in constant motion and continually exposing fresh surfaces to said diradicals, said particles being maintained at a temperature below 200° C., and below the condensation temperature of the reactive diradical whereby the reactive diradicals condense and polymerize, thereby coating said particulate material with a continuous polymeric film of a p-xylylene polymer having the general repeating unit:

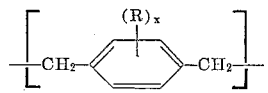

wherein R and x are as defined above.

2. The method defined in claim 1 wherein the pyrolysis is conducted at a pressure of between about 0.0001 and 10.0 mm. Hg.

3. The method defined in claim 1 wherein an inert vaporous diluent is employed in the pyrolysis.

4. The method defined in claim 1 wherein the particulate material to be coated is a highly reactive material susceptible to moisture and chemical attack.

5. The method defined in claim 1 wherein the particulate material is maintained in continual random tumbling motion thereby constantly exposing fresh particulate surfaces to the polymerizing diradicals.

6. The method defined in claim 1 wherein the particulate material is maintained in continual random vibrational motion thereby constantly exposing fresh particle surfaces to the polymerizing diradicals.

7. The method defined in claim 1 wherein the di-p-xylylene is first vaporized at temperatures of at least about 150° C. and the vaporous di-p-xylylene is subsequently pyrolyzed at temperatures between 550° and 700° C.

8. Coated particulate material having as an encapsulating coating a continuous film of a tough, solvent-resistant solid polymerization product of the pyrolyzed vapors of a cyclic-di-p-xylylene, said product having the general repeating unit

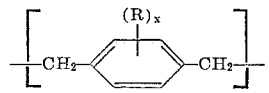

wherein R is an aromatic nuclear substituent group and x is a number from 0 to 3, inclusive.

9. The coated particulate material defined in claim 8 wherein the material is a liquid droplet.

10. The coated particulate material defined in claim 9 wherein the liquid droplet is precoated to form a composite particle.

11. The coated particulate material defined in claim 8 wherein the material is a reactive additive.

12. Coated particulate highly reactive material normally susceptible to moisture and chemical attack having as an encapsulating coating, a continuous film of a tough solvent-resistant solid polymerization product of the pyrolyzed vapors of a cyclic-di-p-xylylene, said product having the general repeating unit

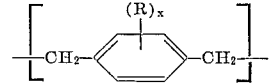

wherein R is an aromatic nuclear substituent group and x is a number from 0 to 3, inclusive.

13. The coated particulate material defined in claim 12 wherein the material is a metal hydride.

14. The coated particulate material defined in claim 12 wherein the material is a perchlorate.

15. Particulate lithium aluminum hydride having as an encapsulating coating, a continuous film of a tough solvent resistant solid polymerization product of the pyrolyzed vapors of a cyclic-di-p-xylylene, said product having the general repeating unit

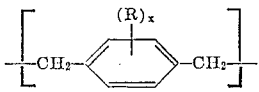

wherein R is an aromatic nuclear substituent group and $x$ is a number from 0 to 3 inclusive.

16. Particulate lithium hydride having as an encapsulating coating, a continuous film of a tough solvent resistant solid polymerization product of the pyrolyzed vapors of a cyclic di-p-xylylene, said product having the general repeating unit

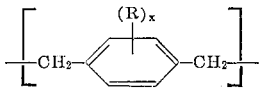

wherein R is an aromatic nuclear substituent group and $x$ is a number from 0 to 3 inclusive.

17. Particulate lithium metal having as an encapsulating coating, a continuous film of a tough solvent resistant solid polymerization product of the pyrolyzed vapors of a cyclic-di-p-xylylene, said product having the general repeating unit

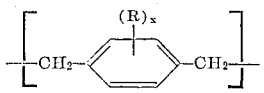

wherein R is an aromatic nuclear substituent group and $x$ is a number from 0 to 3 inclusive.

18. Particulate lithium fluoride having as an encapsulating coating, a continuous film of a tough solvent resistant solid polymerization product of the pyrolyzed vapors of a cyclic-di-p-xylylene, said product having the general repeating unit

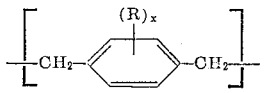

wherein R is an aromatic nuclear substituent group and $x$ is a number from 0 to 3, inclusive.

19. Particulate lithium tetraborate having as an encapsulating coating, a continuous film of a tough solvent resistant solid polymerization product of the pyrolyzed vapors of a cyclic-di-p-xylylene, said product having the general repeating unit

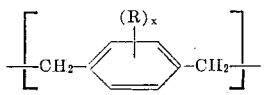

wherein R is an aromatic nuclear substituent group and $x$ is a number from 0 to 3 inclusive.

20. Particulate lithium perchlorate having as an encapsulating coating, a continuous film of a tough solvent resistant solid polymerization product of the pyrolyzed vapors of a cylic-di-p-xylylene, said product having the general repeating unit

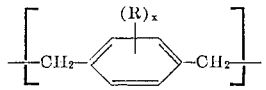

wherein R is an aromatic nuclear substituent group and $x$ is a number from 0 to 3 inclusive.

21. Particulate ammonium perchlorate having as an encapsulating coating, a continuous film of a tough solvent resistant solid polymerization product of the pyrolyzed vapors of a cyclic-di-p-xylylene, said product having the general repeating unit

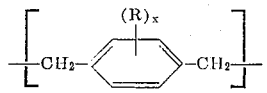

wherein R is an aromatic nuclear substituent group and $x$ is a number from 0 to 3 inclusive.

22. Particulate sodium hydroxide having as an encapsulating coating, a continuous film of a tough solvent resistant solid polymerization product of the pyrolyzed vapors of a cyclic-di-p-xylylene, said product having the general repeating unit

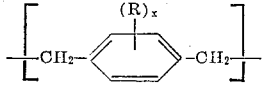

References Cited by the Examiner

UNITED STATES PATENTS

| | | | |
|---|---|---|---|
| 2,513,997 | 7/1950 | Gibb | 117—100 |
| 2,785,090 | 3/1957 | Kirk | 117—100 X |
| 3,035,948 | 5/1962 | Fox | 149—19 |

MURRAY KATZ, *Primary Examiner.*

E. J. CABIC, *Assistant Examiner.*